(12) United States Patent
Brinas

(10) Patent No.: US 8,960,481 B2
(45) Date of Patent: Feb. 24, 2015

(54) ADAPTABLE BIN WITH MOVEABLE SHELF

(71) Applicant: GM Global Technology Operations LLC, Detroit, MI (US)

(72) Inventor: Gerard Brinas, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 79 days.

(21) Appl. No.: 13/803,031

(22) Filed: Mar. 14, 2013

(65) Prior Publication Data

US 2014/0265408 A1    Sep. 18, 2014

(51) Int. Cl.
*B60R 7/04* (2006.01)
(52) U.S. Cl.
CPC ........................................ *B60R 7/04* (2013.01)
USPC ....................................... 220/531; 296/24.34
(58) Field of Classification Search
USPC ........... 296/37.8, 24.34, 37.16; 224/539, 544; 220/531, 529, 505, 23.86
See application file for complete search history.

(56) References Cited

U.S. PATENT DOCUMENTS 8,011,710 B2 *   9/2011   Stueber ...................... 296/24.34
8,733,578 B2 *   5/2014   Michaels ....................... 220/531

* cited by examiner

*Primary Examiner* — Joseph D Pape
(74) *Attorney, Agent, or Firm* — Quinn Law Group, PLLC

(57) ABSTRACT

An adaptable bin includes a bin floor and at least two bin walls. The bin floor and the bin walls define a storage volume. An opening is defined by the bin walls, and allows access to the storage volume. The adaptable bin includes a moveable shelf, which has a shelf floor and a shelf connector mated to one of the bin walls. The shelf connector is rotatable, relative to the bin walls, about an axis. The moveable shelf also includes a shelf arm connecting the shelf floor to the shelf connector. The moveable shelf is selectively rotatable about the axis between a first position and a second position. The first position substantially blocks access to the bin floor from the opening. The second position allows substantially-unimpeded access to the bin floor from the opening.

11 Claims, 5 Drawing Sheets

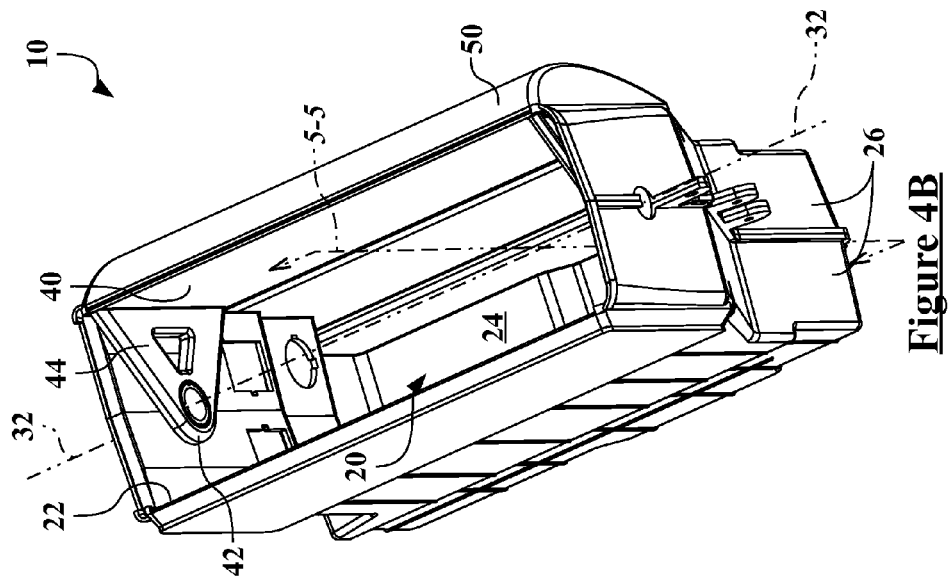
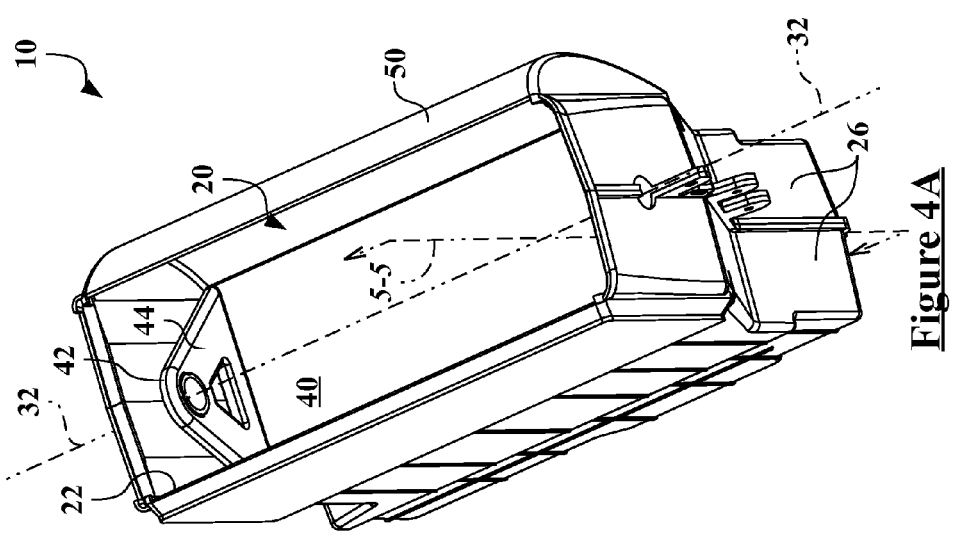

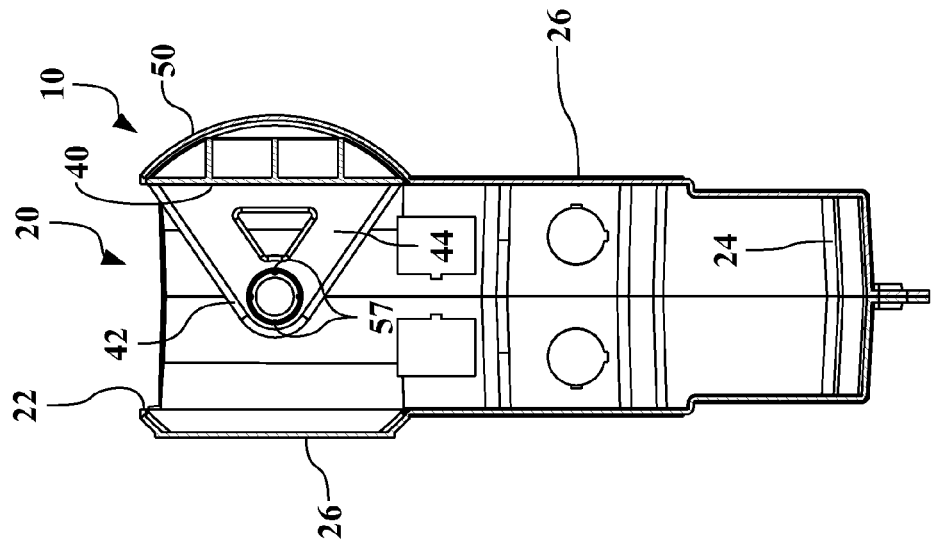
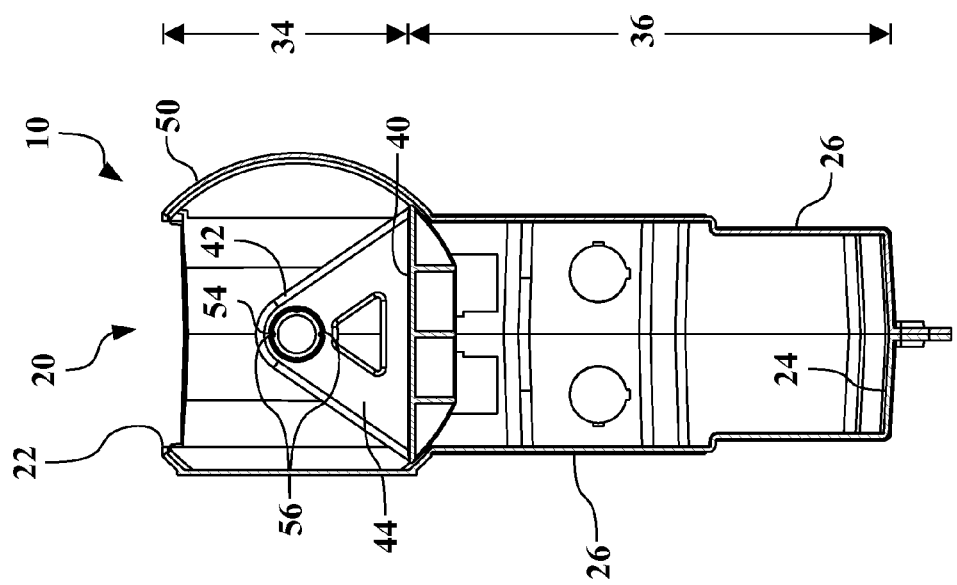

ADAPTABLE BIN WITH MOVEABLE SHELF

TECHNICAL FIELD

This disclosure relates to storage bins, particularly those used in vehicles.

BACKGROUND

Storage bins may be used to hold various items in the vehicle, including electronics, vehicle accessories, or personal items. Some vehicles may include one or more storage bins between or adjacent to passenger seats. Occupants within the vehicle use the storage bins to store or secure various objects.

SUMMARY

An adaptable bin usable within a vehicle is provided. The adaptable bin includes a bin floor and at least two bin walls. The bin floor and the bin walls define a storage volume within the adaptable bin. An opening is defined by the bin walls, and allows access to the storage volume.

The adaptable bin includes a moveable shelf within the storage volume. The moveable shelf includes a shelf floor and a shelf connector mated to one of the bin walls. The shelf connector is rotatable, relative to the bin walls, about an axis. The moveable shelf also includes a shelf arm connecting the shelf floor to the shelf connector. The moveable shelf is selectively rotatable about the axis between a first position and a second position. The first position substantially blocks access to the bin floor from the opening, while the second position substantially allows unimpeded access to the bin floor from the opening.

The above features and advantages, and other features and advantages, of the present invention are readily apparent from the following detailed description of some of the best modes and other embodiments for carrying out the invention, which is defined solely by the appended claims, when taken in connection with the accompanying drawings.

BRIEF DESCRIPTION OF THE DRAWINGS

FIG. 4A is a schematic isometric view of the adaptable bin in a first position, which forms a secondary bin;

FIG. 4B is a schematic isometric view of the adaptable bin in a second position, which allows access to a primary bin;

FIG. 5A is a schematic cross-sectional view taken along a section line 5-5 of FIG. 4A; and FIG. 5B is a schematic cross-sectional view taken along a section line 5-5 of FIG. 4B.

DETAILED DESCRIPTION

Figure 1:
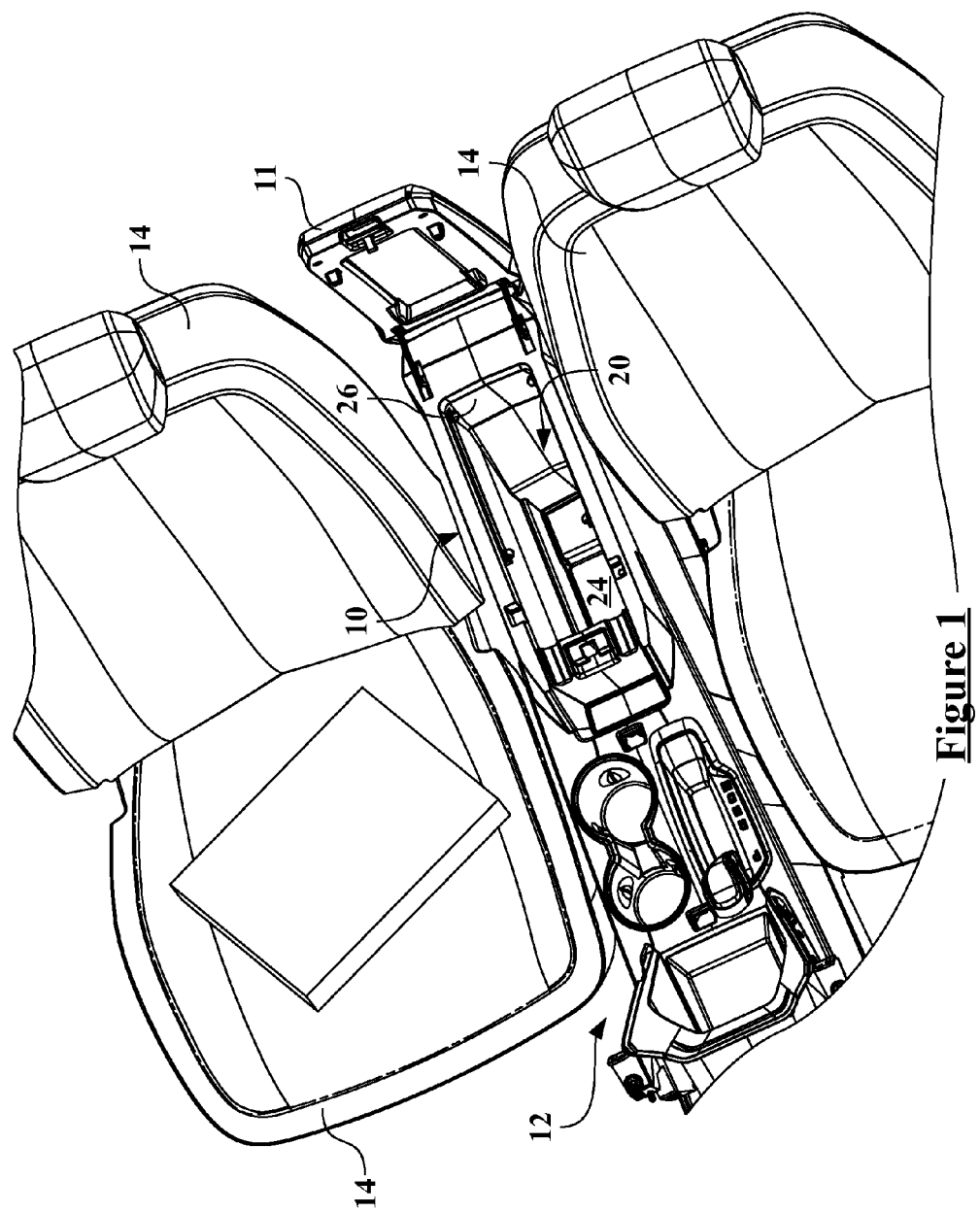
FIG. 1 is a schematic isometric view of an adaptable bin disposed within a console between two passenger seats.

Referring to the drawings, like reference numbers correspond to like or similar components wherever possible throughout the several figures. FIG. 1 shows an adaptable bin 10 for a vehicle (not shown), which may be used for storage of numerous objects or components. The adaptable bin 10 may be located in the passenger compartment or elsewhere within the vehicle. A lid 11 selectively closes and substantially prevents access to the adaptable bin 10.

While the present invention may be described with respect to automotive or vehicular applications, those skilled in the art will recognize the broader applicability of the invention. Those having ordinary skill in the art will recognize that terms such as "above," "below," "upward," "downward," et cetera, are used descriptively of the figures, and do not represent limitations on the scope of the invention, as defined by the appended claims. Any numerical designations, such as "first" or "second" are illustrative only and are not intended to limit the scope of the invention in any way.

Features shown in one figure may be combined with, substituted for, or modified by, features shown in any of the figures. Unless stated otherwise, no features, elements, or limitations are mutually exclusive of any other features, elements, or limitations. Any specific configurations shown in the figures are illustrative only and the specific configurations shown are not limiting of the claims or the description. All elements may be mixed and matched between figures.

The adaptable bin 10 is disposed within a console 12, which is generally located between passenger seats 14. However, the adaptable bin 10 may be located elsewhere, such as the interior side of a door, beneath a removeable rear seat cushion, on the dashboard, or within the trunk or boot.

Figure 2:
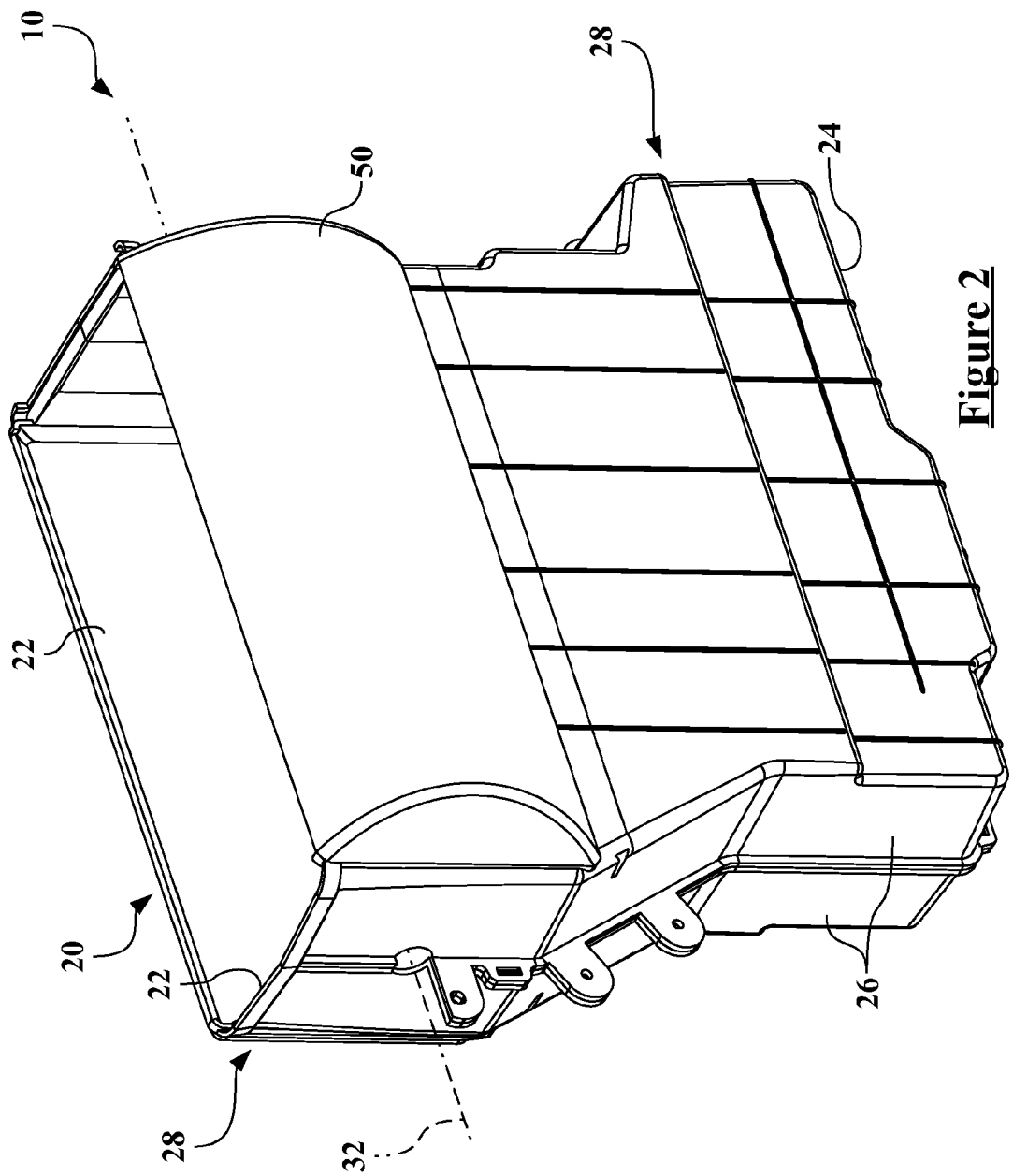
FIG. 2 is a schematic isometric view of the adaptable bin of FIG. 1.
Figure 3:
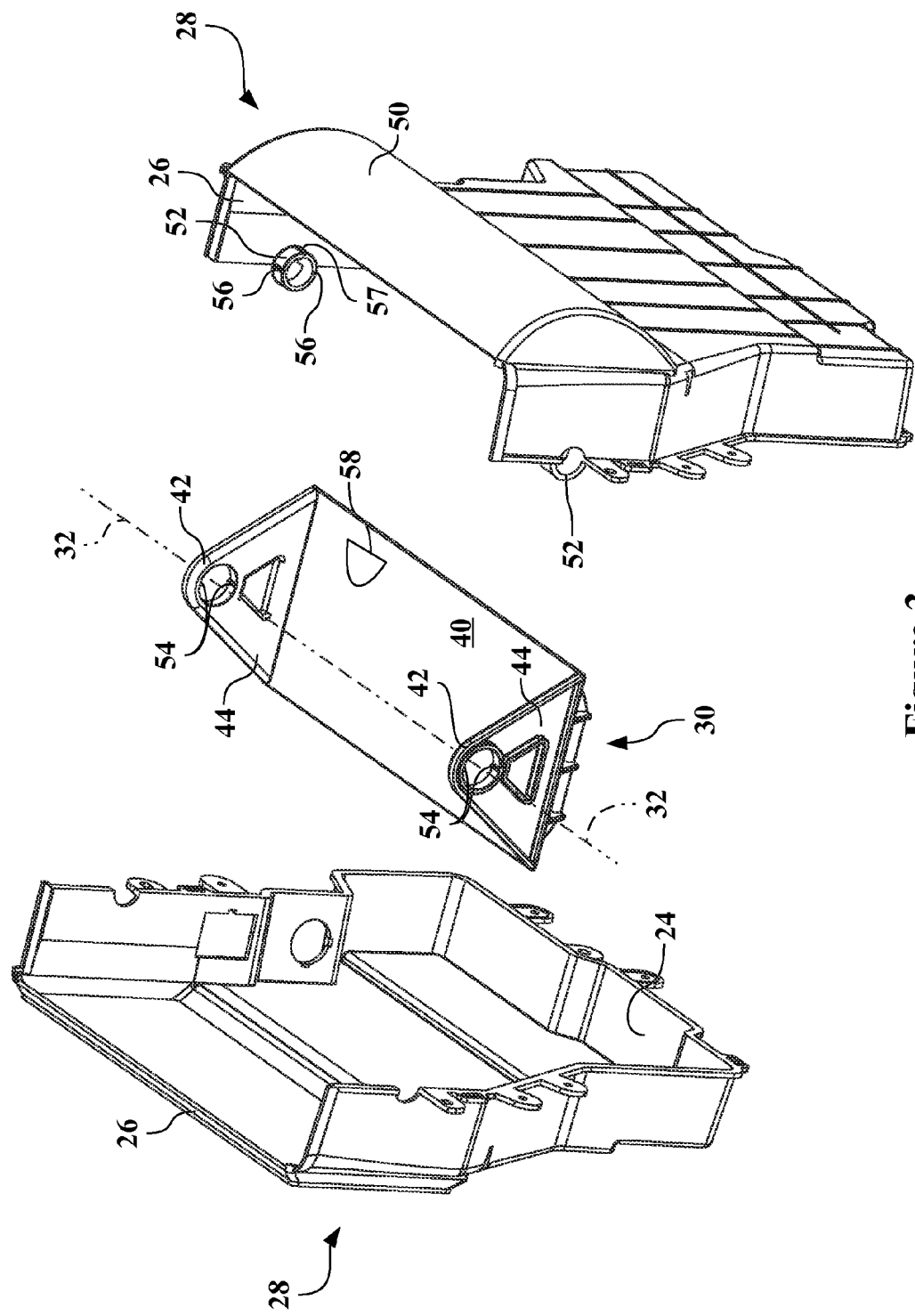
FIG. 3 is a schematic exploded isometric view of the adaptable bin of FIG. 1.

Referring also to FIG. 2 and FIG. 3, in addition to FIG. 1, there are shown other views of the adaptable bin 10. FIG. 2 shows the adaptable bin 10 without surrounding components of the vehicle. FIG. 3 shows an exploded view of the adaptable bin 10 to illustrate one configuration of the components used to assemble and form the adaptable bin 10.

The adaptable bin 10 defines a storage volume 20 accessible through an opening 22, which is at the top of the adaptable bin 10, relative to the likely orientation of the adaptable bin 10 within the vehicle. However, it should be understood that other orientations of the adaptable bin 10 are possible, and that angling the adaptable bin 10 slightly will have little measurable effect on its performance.

The adaptable bin 10 shown is formed from a bin floor 24 and at least two bin walls 26. The opening 22 is defined by the bin walls 26, and allows access to the storage volume 20. The bin floor 24 and the bin walls 26 define the storage volume 20. Additionally, many configurations of the adaptable bin 10 will include a lid or closure (not shown) that selectively closes the storage volume 20 by blocking access to the opening 22.

In the configuration shown, two bin halves 28, which may be injection-molded pieces, cooperate to form the bin walls 26 and the bin floor 24. Each of the bin halves 28 form side wall portions, end wall portions, and floor portions. However, note that other configurations of the adaptable bin 10 may not include similarly-defined end wall portions, such that much of the ends may be rounded. Furthermore, separate components may be used to form the side wall portions, end wall portions, and floor portions of the adaptable bin 10.

As shown in FIG. 3, the adaptable bin 10 includes a moveable shelf 30, which is operatively attached to at least one of the bin walls 26. The moveable shelf 30 is selectively rotatable about an axis 32. The moveable shelf 30 rotates between a first position, which substantially blocks access to the bin floor 24 from the opening 22, and a second position, which substantially allows unimpeded access to the bin floor 24 from the opening 22.

Referring now to FIGS. 4A-4B and FIGS. 5A-5B, and with continued reference to FIGS. 1-3, there are shown additional views of the adaptable bin 10 in the first and second positions. FIG. 4A shows the adaptable bin 10 with the moveable shelf 30 in the first position, such that only a portion of the storage volume 20 is accessible from the opening 22. FIG. 4B shows the adaptable bin 10 with the moveable shelf 30 in the second position, such that all of the storage volume 20 is accessible from the opening 22. FIG. 5A shows a cross sectional of the adaptable bin 10 taken along a section line 5-5 of FIG. 4A, and FIG. 5B shows a cross sectional of the adaptable bin 10 taken along a section line 5-5 of FIG. 4B.

As shown in the figures, the moveable shelf 30 may be operatively attached to both of the bin walls 26, to facilitate rotation about the axis 32 between the first position and the second position. In the first position shown in FIGS. 4A and 5A, the moveable shelf 30 divides the storage volume 20 into an upper storage volume 34 and a lower storage volume 36. Therefore, it may be said that the moveable shelf 30 creates a secondary bin, which includes only the upper storage volume 34, when the moveable shelf 30 is in the first position.

Similarly, when the moveable shelf 30 is in the second position, it creates a primary bin, which includes both the lower storage volume 36 and the upper storage volume 34. The bin walls 26 form the side walls of the primary bin, and also form the side walls of the secondary bin. When in the second position, the moveable shelf 30 allows large objects to be placed into the primary bin, such as laptops or large tablet computers, that could would not fit into solely into the lower storage volume 36. Note that objects capable of fitting within the lower storage volume 36 may generally remain even when the moveable shelf 30 is in the first position.

The moveable bin 30 does not need to be detached or removed from the adaptable bin 10 in order to create either the primary bin or the second bin. The adaptable bin 10 provides flexibility for storage of different types and sizes of objects within different combinations of the same storage volume 20. Furthermore, the adaptable bin 10 provides this flexibility without the risk of losing the secondary bin, which may be the case with removable secondary bins.

The moveable shelf 30 includes a shelf floor 40, which forms the base for the secondary bin and may hold items that fit within the upper storage volume 34 while the moveable shelf 30 is in the first position. At least one shelf connector 42 is mated to one of the bin walls 26 near the axis 32. In the configuration shown, each of the ends of the moveable shelf 30 has shelf connectors 42, such that the shelf connectors 42 may be referred to as first and second in any order.

The shelf connectors 42 are rotatable about the axis 32 relative the bin walls 26. One or more shelf arms 44 connect the shelf floor 40 to the shelf connector 42. The shelf arms 44 also offset the shelf floor 40 from the axis 32, such that the shelf floor 40 swings out of the storage volume 20 instead of simply rotating sideways within the storage volume 20. The shelf connectors 42 may be defined as portions of the shelf arms 44.

The shelf connectors 42 may be any shape or structure sufficient to allow the moveable shelf 30 to rotate about the axis 32, with or without any intermediary structure on the bin walls 26. In some configurations, the shelf connectors 42 may attach or mate directly to the bin walls 26.

In the configuration shown, one or more rotation cylinders 52 are operatively attached to the bin walls 26 and are generally aligned with the axis 32. The shelf connectors 42 are mated to the rotation cylinders 52 and rotate about the rotation cylinders 52. As shown in the figures, the adaptable bin 10 may have rotation cylinders 52 on both sides of the moveable shelf 30. The rotation cylinders 52 may be referred to as first and second in any order.

The adaptable bin 10 shown also includes an arced portion 50 formed in the one of the bin walls 26. The arced portion 50 is substantially constant distance from the axis 32. Therefore, the moveable shelf 30 nests within the arced portion 50 when in the second position, such that the shelf floor 40 is substantially coplanar with the bin wall 26 in which the arced portion 50 is formed. The arced portion 50 allows the moveable shelf 32 to swing out of the way without blocking access to the bin floor 24.

In the figures, one or more detent features 54 are formed on the shelf connector 42. The detent features 54 are vertically aligned in FIG. 5A and are horizontally aligned in FIG. 5B. Note that the detent features 54 may be formed on either the rotation cylinder 52 or the shelf connector 42.

One or more first notch features 56 are formed on the rotation cylinder 52. However, the notch feature may be formed on either the rotation cylinder 52 or the shelf connector 42. The detent feature 54 and the first notch feature 56 cooperate to hold the moveable shelf 30 in the first position, as shown in FIG. 5B. One or more second notch features 57 are formed on the rotation cylinder 52. The detent feature 54 and the second notch feature 57 cooperate to hold the moveable shelf 30 in the second position, as shown in FIG. 5B.

The detent features 54, first notch features 56, and second notch features 57 are configured for positioning and holding the moveable shelf 30 in relation to the bin walls 26, such that the moveable shelf 30 can be released by force but is unlikely to move inadvertently as a result of vehicle movement.

The first notch features 56 and the second notch features 57 could be either horizontally or vertically aligned. If there are additional detent features 54, then the detent features 54 may cooperate with both the first notch features 56 and the second notch features 57, such that all of the features assist in holding both the first position and the second position of the moveable shelf 30. However, note that this configuration would increase the effort necessary to overcome the holding force applied between the rotation cylinders 52 and the shelf connectors 42.

In some configurations of the adaptable bin 10, the shelf connectors 42 mate to the bin walls 26 without the rotation cylinders 52 as an intermediary. Therefore, the detent features 54, the first notch feature 56, and the second notch feature 57 may be formed on, and act directly between, the shelf connectors 42 and the bin walls 26.

The moveable shelf 30 may also have features to help the operator of the vehicle adjust the moveable shelf 30 between the first position and the second position. For example, and without limitation, one or more pulls 58 may be formed into the shelf floor 40. However, the moveable shelf 30 may also be moved by applying pressure to the shelf floor 40 near the edge opposite from the arced portion 50.

The detailed description and the drawings or figures are supportive and descriptive of the invention, but the scope of the invention is defined solely by the claims. While some of the best modes and other embodiments for carrying out the claimed invention have been described in detail, various alternative designs, configurations, and embodiments exist for practicing the invention defined in the appended claims.

The invention claimed is:

1. An adaptable bin, comprising:
   a bin floor;
   at least two bin walls, wherein the bin floor and the bin walls define a storage volume;
   an opening defined by the bin walls, wherein the opening allows access to the storage volume; and
   a moveable shelf, including:
   a shelf floor;
   a shelf connector mated to one of the bin walls, wherein the shelf connector is rotatable about an axis relative the bin walls; and a shelf arm connecting the shelf floor to the shelf connector, wherein the shelf arm is disposed between the shelf floor and the shelf connector, such that the shelf floor is spaced from the shelf connector and does not intersect the axis, wherein the moveable shelf is selectively rotatable about the axis between a first position, which substantially blocks access to the bin floor from the opening, and a second position, which substantially allows unimpeded access to the bin floor from the opening.

2. The adaptable bin of claim 1, further comprising:
a rotation cylinder operatively attached to one of the bin walls and aligned with the axis, wherein the shelf connector is mated to the rotation cylinder and rotates about the rotation cylinder.

3. The adaptable bin of claim 2, further comprising:
a detent feature formed on one of the rotation cylinder and the shelf connector; and
a first notch feature formed on the other of the rotation cylinder and the shelf connector, wherein the detent feature and the first notch feature cooperate to hold the moveable shelf in one of the first position and the second position.

4. The adaptable bin of claim 3, further comprising:
a second notch feature formed on the other of the rotation cylinder and the shelf connector, wherein the detent feature and the second notch feature cooperate to hold the moveable shelf in the other of the first position and the second position not held by the detent feature and the first notch feature.

5. The adaptable bin of claim 4, wherein the rotation cylinder is a first rotation cylinder and the shelf connector is a first shelf connector, further comprising:
a second rotation cylinder operatively attached to the other of the bin walls opposite the first rotation cylinder and aligned with the axis; and
a second shelf connector mated to the second rotation cylinder.

6. The adaptable bin of claim 5, further comprising:
an arced portion formed in the one of the bin walls, wherein the arced portion is substantially constant distance from the axis,
wherein the moveable shelf nests within the arced portion when in the second position, such that the shelf floor is substantially coplanar with the bin wall in which the arced portion is formed.

7. The adaptable bin of claim 6, wherein the shelf floor is substantially parallel to the opening when the moveable shelf is in the first position.

8. The adaptable bin of claim 1, further comprising:
an arced portion formed in the one of the bin walls, wherein the arced portion is substantially constant distance from the axis,
wherein the moveable shelf nests within the arced portion when in the second position, such that the shelf floor is substantially coplanar with the bin wall in which the arced portion is formed.

9. An adaptable bin, comprising:
a bin floor;
at least two bin walls, wherein the bin floor and the bin walls define a storage volume;
an opening defined by the bin walls, wherein the opening allows access to the storage volume;
an arced portion formed in one of the bin walls, wherein the arced portion is substantially constant distance from the axis; and
a moveable shelf, including:
a shelf floor;
a shelf connector mated to one of the bin walls, wherein the shelf connector is rotatable about an axis relative the bin walls; and
a shelf arm connecting the shelf floor to the shelf connector,
wherein the moveable shelf is selectively rotatable about the axis between a first position, which substantially blocks access to the bin floor from the opening and in which the shelf floor is substantially parallel to the opening, and a second position, which substantially allows unimpeded access to the bin floor from the opening and in which the moveable shelf nests within the arced portion such that the shelf floor is substantially coplanar with the bin wall.

10. The adaptable bin of claim 9, further comprising:
a detent feature formed on one of the shelf connector and the bin wall; and
a first notch feature formed on the other of the shelf connector and the bin wall, wherein the detent feature and the first notch feature cooperate to hold the moveable shelf in one of the first position and the second position.

11. The adaptable bin of claim 10, further comprising:
a second notch feature formed on the other of the shelf connector and the bin wall, wherein the detent feature and the second notch feature cooperate to hold the moveable shelf in the other of the first position and the second position not held by the detent feature and the first notch feature.

\* \* \* \* \*